United States Patent
Stevens

(10) Patent No.: US 9,182,495 B2
(45) Date of Patent: Nov. 10, 2015

(54) SYSTEM AND METHOD FOR MONITORING INTEGRITY OF A GLOBAL NAVIGATION SATELLITE SYSTEM

(75) Inventor: Tim Stevens, Golden, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 628 days.

(21) Appl. No.: 13/565,750

(22) Filed: Aug. 2, 2012

(65) Prior Publication Data

US 2014/0097984 A1 Apr. 10, 2014

Related U.S. Application Data

(60) Provisional application No. 61/537,546, filed on Sep. 21, 2011.

(51) Int. Cl.
*G01S 19/20* (2010.01)
*G01S 19/45* (2010.01)

(52) U.S. Cl.
CPC ...... *G01S 19/20* (2013.01); *G01S 19/45* (2013.01)

(58) Field of Classification Search
CPC ......... G01S 19/20; G01S 19/25; G01S 19/26; G01S 19/46
USPC .............. 342/357.58, 357.64, 357.65, 357.29
See application file for complete search history.

(56) References Cited

U.S. PATENT DOCUMENTS

| | | | |
|---|---|---|---|
| 8,040,275 B2 | 10/2011 | Ronald et al. | |
| 2005/0090265 A1* | 4/2005 | Abraham | 455/456.1 |
| 2005/0096844 A1* | 5/2005 | Pasturel et al. | 701/214 |
| 2010/0090896 A1* | 4/2010 | LaMance et al. | 342/357.15 |
| 2011/0012781 A1 | 1/2011 | Ronald et al. | |
| 2011/0133888 A1 | 6/2011 | Stevens et al. | |
| 2011/0287779 A1* | 11/2011 | Harper | 455/456.1 |

\* cited by examiner

*Primary Examiner* — Harry Liu
(74) *Attorney, Agent, or Firm* — McDermott Will & Emery LLP

(57) ABSTRACT

A system and method for monitoring integrity of a Global Navigation Satellite System (GNSS) are provided. Integrity of a GNSS location is assessed based on a comparison of the GNSS location with one or more locations received from at least one other GNSS. Integrity of the GNSS location is also assessed based on a comparison of the GNSS location with one or more locations obtained from signals generated by one or more known located emitters. Integrity of the GNSS location is also assessed based on a comparison of the GNSS location with historical data, which may include contextual information of recent GNSS locations of a user equipment, measurements made by an inertial navigation system of the user equipment, and prior measurements made by the user equipment during similar paths. An integrity warning is outputted when one or more of the integrity assessments indicate a loss of integrity of GNSS.

4 Claims, 11 Drawing Sheets

SYSTEM AND METHOD FOR MONITORING INTEGRITY OF A GLOBAL NAVIGATION SATELLITE SYSTEM

CROSS-REFERENCE TO RELATED APPLICATIONS

The present application claims the benefit of priority under 35 U.S.C. 119 from U.S. Provisional Patent Application Ser. No. 61/537,546, entitled "System and Method for Determining the Integrity of Location Information," filed on Sep. 21, 2011, the disclosure of which is hereby incorporated by reference in its entirety for all purposes.

FIELD

The subject technology generally relates to global navigation satellite systems, and, in particular, relates to systems and methods for monitoring a global navigation satellite system.

BACKGROUND

Satellite-based navigation may be used to navigate an aircraft, e.g., during landing of the aircraft. In order to ensure the safety of the aircraft, it is important to monitor the integrity of the navigation locations. Present integrity monitoring measures the consistency of locations obtained from different combinations of satellite signals within a constellation to detect anomalous signals from individual satellites. However, this approach does not handle the case of an anomaly in the control segment of a global navigation satellite system which could affect some or all satellites in the system, or the case of intentional spoofing of satellite signals in the region of the navigation user equipment.

SUMMARY

According to various aspects of the subject technology, a method for monitoring integrity of a Global Navigation Satellite System (GNSS) is provided. The method comprises assessing integrity of a GNSS location based on a comparison of the GNSS location with one or more locations received from at least one other GNSS. The method further comprises assessing integrity of the GNSS location based on a comparison of the GNSS location with one or more locations obtained from signals generated by one or more known local fixed emitters. The method further comprises assessing integrity of the GNSS location based on a comparison of the GNSS location with historical data, wherein the historical data comprise at least one of contextual information of recent GNSS locations of a user equipment, measurements made by an inertial navigation system of the user equipment, and prior measurements made by the user equipment during similar paths. The method further comprises outputting an integrity warning when one or more of the integrity assessments indicate a loss of integrity of the GNSS.

According to various aspects of the subject technology, a system for monitoring integrity of a GNSS system is provided. The system comprises a navigation user equipment, wherein the navigation user equipment is configured to assess integrity of a GNSS location obtained from the GNSS against one or more locations obtained from at least one other GNSS. The navigation user equipment is further configured to assess integrity of the GNSS location against locations obtained from signals generated by one or more known local fixed emitters. The navigation user equipment is further configured to assess integrity of the GNSS location based on historical data, wherein the historical data comprise at least one of contextual information of recent GNSS locations of a user equipment, measurements made by an inertial navigation system of the user equipment, and prior measurements made by the user equipment during similar paths. The navigation user equipment is further configured to output an integrity warning when one or more of the integrity assessments indicate a loss of integrity of the GNSS. The system further comprises a first communication interface configured to receive fixed emitter information and the historical data from a centralized database, and to load the received fixed emitter information and historical data into the user equipment prior to transiting a path. The system further comprises a second communication interface configured to receive navigational data of the user equipment, and to load the navigational data of the user equipment after transiting a path into the centralized database to update the historical data.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
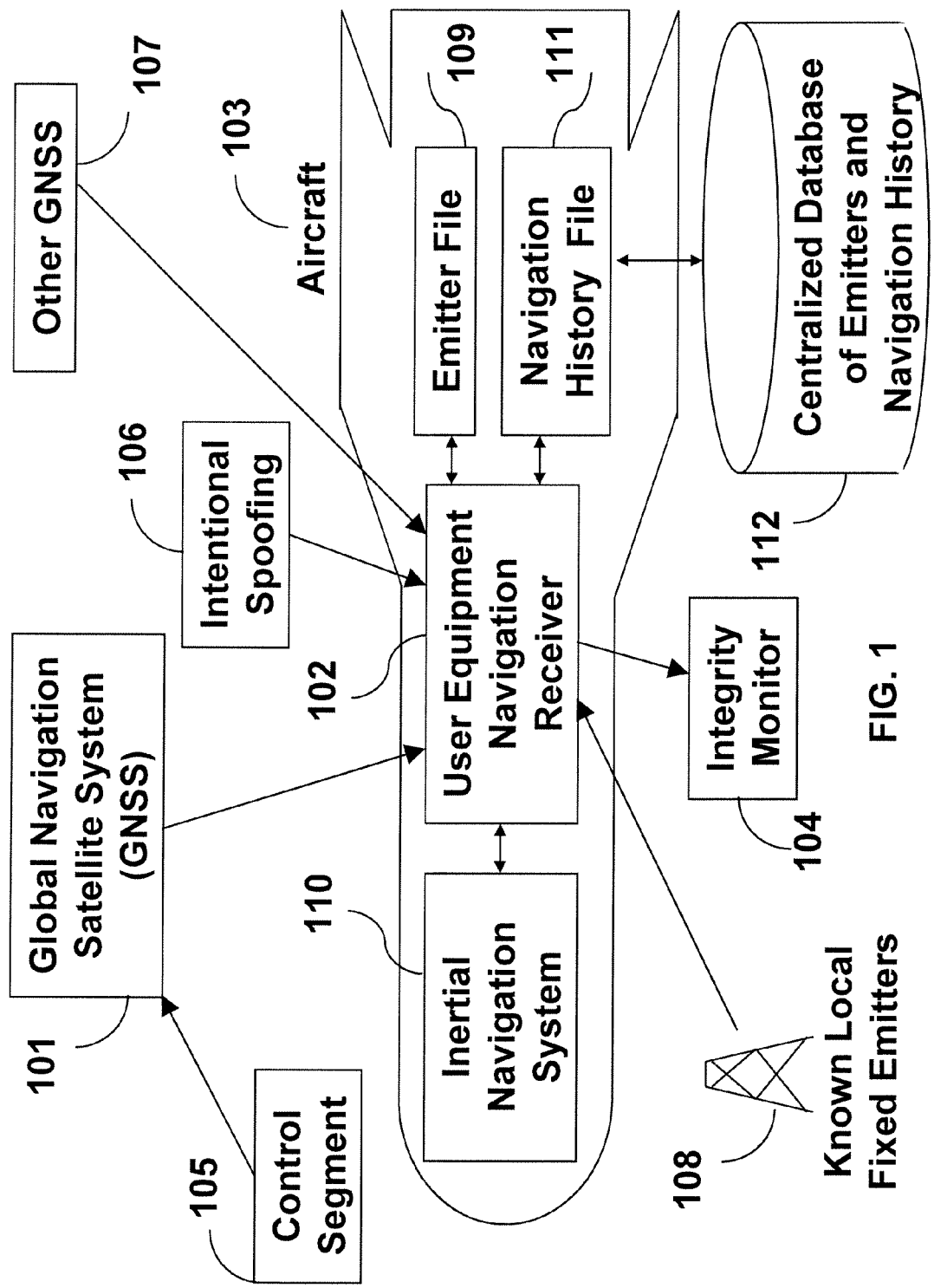
FIG. 1 illustrates an overall diagram of an exemplary integrity application to an aircraft.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A method and system for monitoring the integrity of locations from a Global Navigation Satellite System (GNSS) are disclosed. According to one aspect, the system can detect loss of integrity even should all satellite signals in a GNSS constellation simultaneously lose integrity while maintaining mutual consistency, such as from a control segment anomaly or intentional spoofing in the region of the navigation user equipment.

A GNSS location service such as the United States' Global Positioning System (GPS) may include an integrity function to monitor for reliable location information (for example, information related to a geographic location). The system may include one or more sensors for monitoring GNSS (e.g., GPS) signals and other information associated with the GNSS. The system assesses integrity of a GNSS location based on a comparison of the GNSS location with locations received from at least one other GNSS. Examples of GNSSs that the system may use include European Galileo, GLObal'naya NAvigatsionnaya Sputnikovaya Sistema (Global Navigation Satellite System or GLONASS), and China's Compass or Beidou. A GNSS may be augmented by a Satellite-Based Augmentation System (SBAS) (e.g., to improve accuracy, reliability, and availability). Examples of SBASs may include Wide Area Augmentation System (WAAS), and European Geostationary Navigation Overlay Service (EG-NOS), etc.

The system also assesses integrity of the GNSS location based on comparisons of the GNSS location with locations obtained from signals generated by known local fixed emitters. Examples of known local fixed emitters include cellular base stations, radio stations, navigational beacons, etc. In one example, the system monitors signals generated by known local fixed emitters and determines location based on the known positions of the emitter and measurements of the signals using Frequency Difference of Arrival (FDOA), Time Difference of Arrival (TDOA), joint FDOA and TDOA or other technique.

The system further assesses integrity of the GNSS location based on comparing the GNSS location with historical data. Historical data may include recent GNSS locations of a user equipment, measurements made by inertial navigation system of the user equipment, and prior measurements made by the user equipment during similar flight paths. In one example, if an aircraft is flying at 600 mph, and a new (for example, current) GNSS (e.g., GPS) navigation fix is such that the aircraft would have had to fly 1800 mph from the last navigation fix to reach the new navigation fix, then the accuracy of the new navigation fix can be considered to be suspect. In another example, if the navigation history of a specific airline flight demonstrates that the airline flight always approaches to the East runway, and a new navigation fix indicates an approach to the South runway, then the new navigation fix may be considered suspect.

The system may fuse inputs from the GNSS being monitored, another GNSS, signals from known local fixed emitters, user equipment inertial navigation systems, and context and history from previous user equipment navigation paths, make one or more assessments of the integrity of the GNSS based on one or more of the inputs, and output an integrity warning when one or more of the integrity assessments indicate a loss of integrity of the GNSS. In one example, the integrity warning is outputted when one of the integrity assessments indicate a loss of integrity of the GNSS. In another example, the integrity warning is outputted when two of the integrity assessments indicate a loss of integrity of the GNSS.

FIG. 1 illustrates an overall diagram of an exemplary integrity application to an aircraft. In FIG. 1, a GNSS (e.g., GPS) 101 provides navigation signals to a user equipment navigation receiver 102, which is located in aircraft 103. The user equipment receiver also receives signals from other GNSS 107 (e.g., the Galileo System, Global Navigation Satellite System, the Beidou System, etc.) and compares locations based upon received signals from other GNSS 107 with locations based upon signals received from GNSS 101. Furthermore, the user equipment receiver also receives signals from known local fixed emitters 108 and compares locations based upon the received signals from known local emitters 108 with locations based upon signals received from GNSS 101. In FIG. 1, data of known local emitters 108, such as their geographical locations, are stored in emitter file 109. Furthermore, the user equipment 102 has access to measurements made by inertial navigation system 110. Furthermore, the user equipment receiver also assesses data stored as navigation history files 111 for historical data of past history of navigation paths. The emitter data file 109 and navigation history file 111 are supported from a centralized database 112 to provide storage and updates to this information.

The system compares locations based upon received signals of GNSS 101 with locations based upon received signals from other GNSS 107 to assess integrity of GNSS 101. The system also compares locations based upon the received signals of GNSS 101 with locations based upon received signals from known local emitters 108 to assess the integrity of GNSS 101. The system also compares locations based upon the received signals of GNSS 101 with measurements made by inertial navigation system 110. The system also compares locations based upon the received signals of GNSS 101 with historical data stored in navigation history file 111 to assess the integrity of GNSS 101. The system outputs an integrity warning, which may be provided to an integrity monitor 104, when one or more of the integrity assessments indicate a loss of integrity of the GNSS.

In one example, GNSS 101 provides user equipment navigation receiver 102 with signals corresponding to inaccurate coordinates of aircraft 103's location. This may be due to a control segment 105 anomaly in GNSS 101 or other cause. In this example, locations based upon signals received from GNSS 101 are compared with locations based upon signals received from other GNSS 107, locations based upon signals received from known local fixed emitters 108 and historical data stored in navigation history file 111. The system, upon determining that locations based upon signals received from GNSS 101 do not match locations based upon signals received from other GNSS 107, locations based upon signals received from known local fixed emitters 108 and/or historical data stored in navigation history file 111, outputs an integrity warning to integrity monitor 104. In another example, an intentional spoofing 106 of user equipment navigation receiver 102 causes user equipment navigation receiver 102 to receive signals corresponding to inaccurate coordinates of aircraft 103's location. The locations based upon received signals are also compared with locations based upon signals received from other GNSS 107, locations based upon signals received from known local fixed emitters 108 and historical data stored in navigation history file 111 to determining integrity of the received signals, and an integrity alert is generated upon determining that integrity has been compromised.

Integrity Monitoring via Other Global Navigation Satellite Systems (GNSS)

Figure 2:
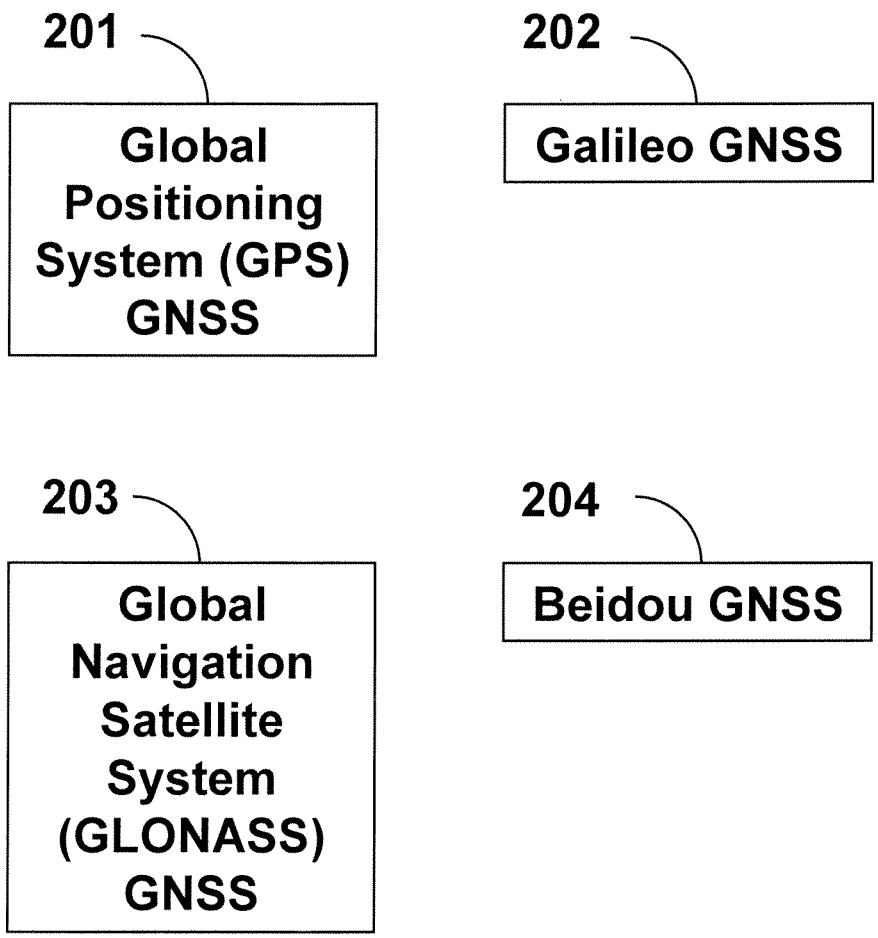
FIG. 2 illustrates example Global Navigation Satellite Systems.

FIG. 2 illustrates example Global Navigation Satellite Systems. Block 201 represents Global Positioning System (GPS) GNSS. Block 202 represents Galileo GNSS. Block 203 represents Global Navigation Satellite System (GLONASS) GNSS. Block 204 represents Beidou GNSS. Each of the GNSS systems may represent GNSS 101. Each of the GNSS systems may represent other GNSS 107. In one example, GNSS 101 is GPS GNSS 201, and other GNSS 107 include Galileo GNSS 202, GLONASS GNSS 203 and Beidou GNSS 204.

Figure 3:
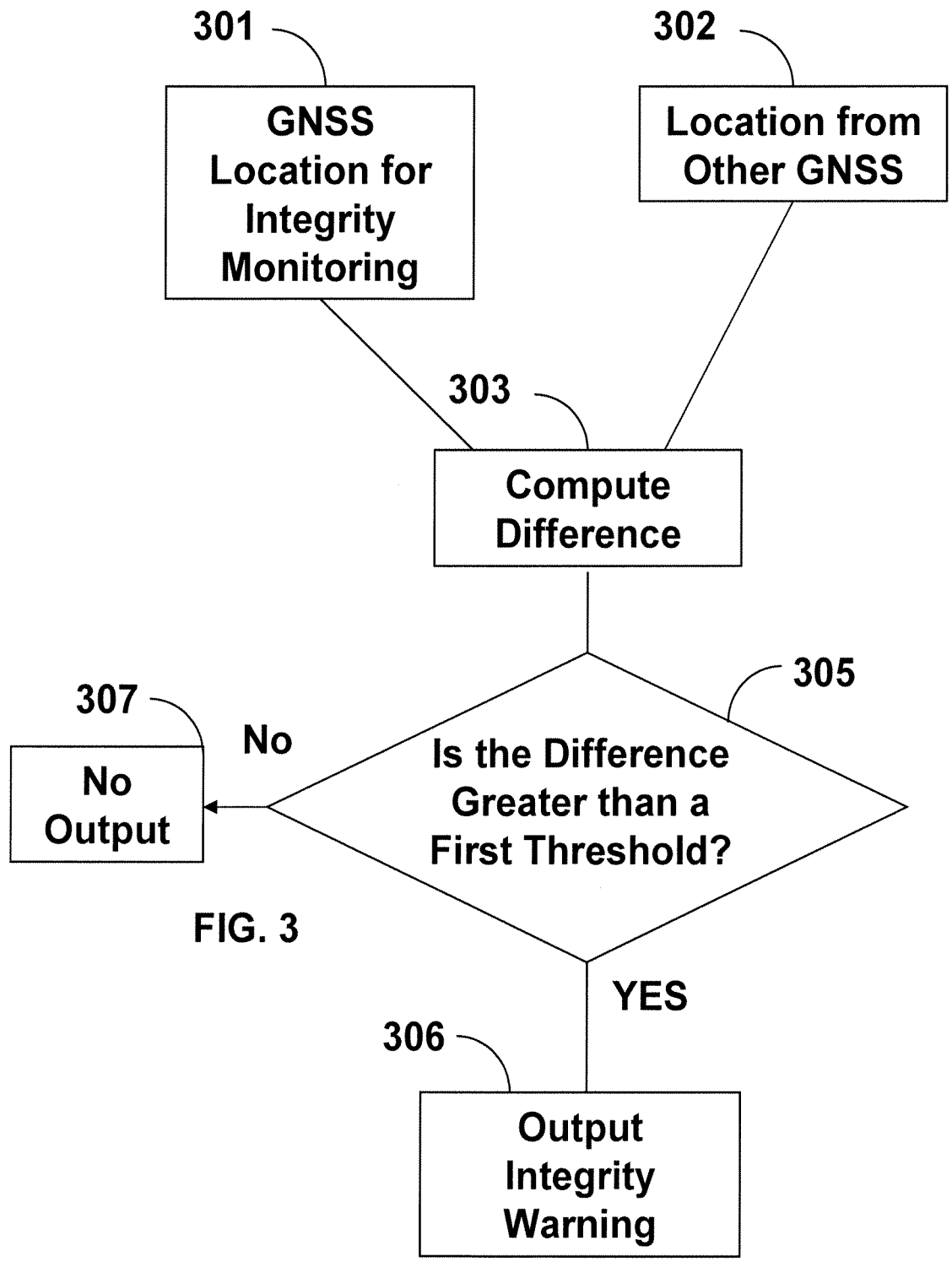
FIG. 3 illustrates an example process for assessing integrity of GNSS based on comparing the GNSS location with one or more locations received from other GNSS.

FIG. 3 illustrates an example process for assessing integrity of GNSS based on comparing the GNSS location with one or more locations received from other GNSS. In block 301, system receives location of aircraft 103 as determined from GNSS 101. In block 302, system receives location of aircraft 103 as determined from other GNSS 107. Integrity of the GNSS location is assessed in block 303 by comparing the location of aircraft 103 as determined from signals from GNSS 101 to the location of the aircraft as determined from other GNSS 107. In FIG. 3, the comparison is made by computing the distance between the two determined locations. In block 305, if the difference between the two determined locations is greater than a first threshold value, the process proceeds to block 306, where an integrity warning is outputted and provided to an integrity monitor 104. If the difference between the two determined locations is not greater than the first threshold, the integrity warning is not outputted in block 307.

Integrity Monitoring via Known Local Fixed Emitters

Figure 4:
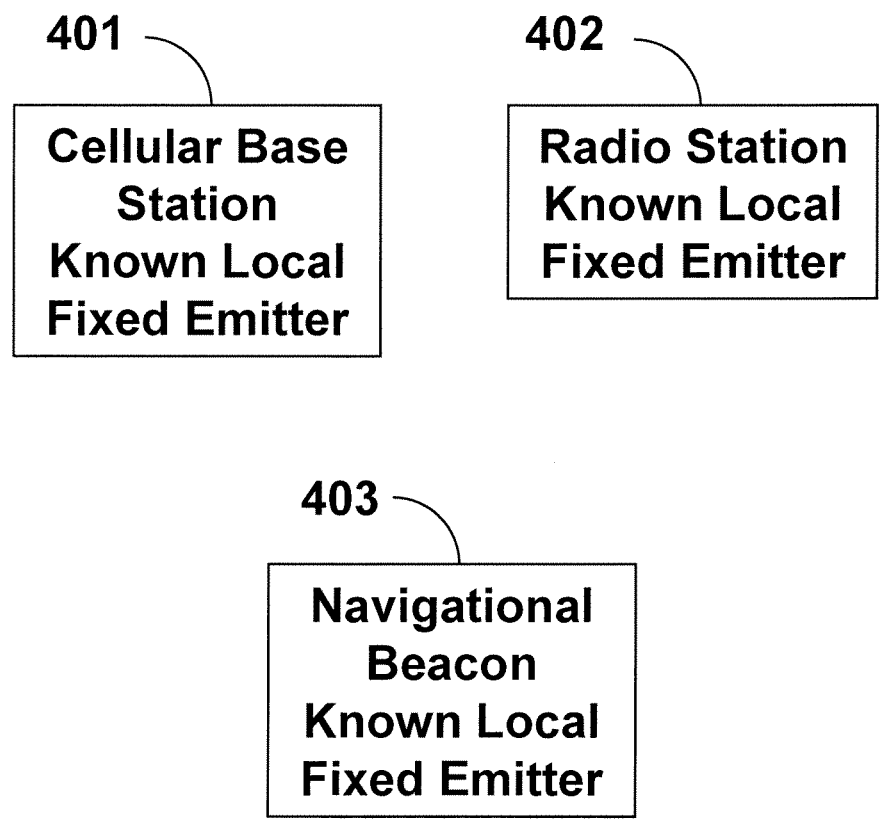
FIG. 4 illustrates example types of known local fixed emitters.

FIG. 4 illustrates example types of known local fixed emitters. Block 401 represents Cellular base stations, which are ubiquitous worldwide. Block 402 represents radio stations. Block 403 represents navigational beacons, which are especially pertinent to the scenario of aircraft landings at an airport or air base. Additional types of known local fixed emitters may generate signals that are used to assess integrity of the GNSS location.

Figure 5:
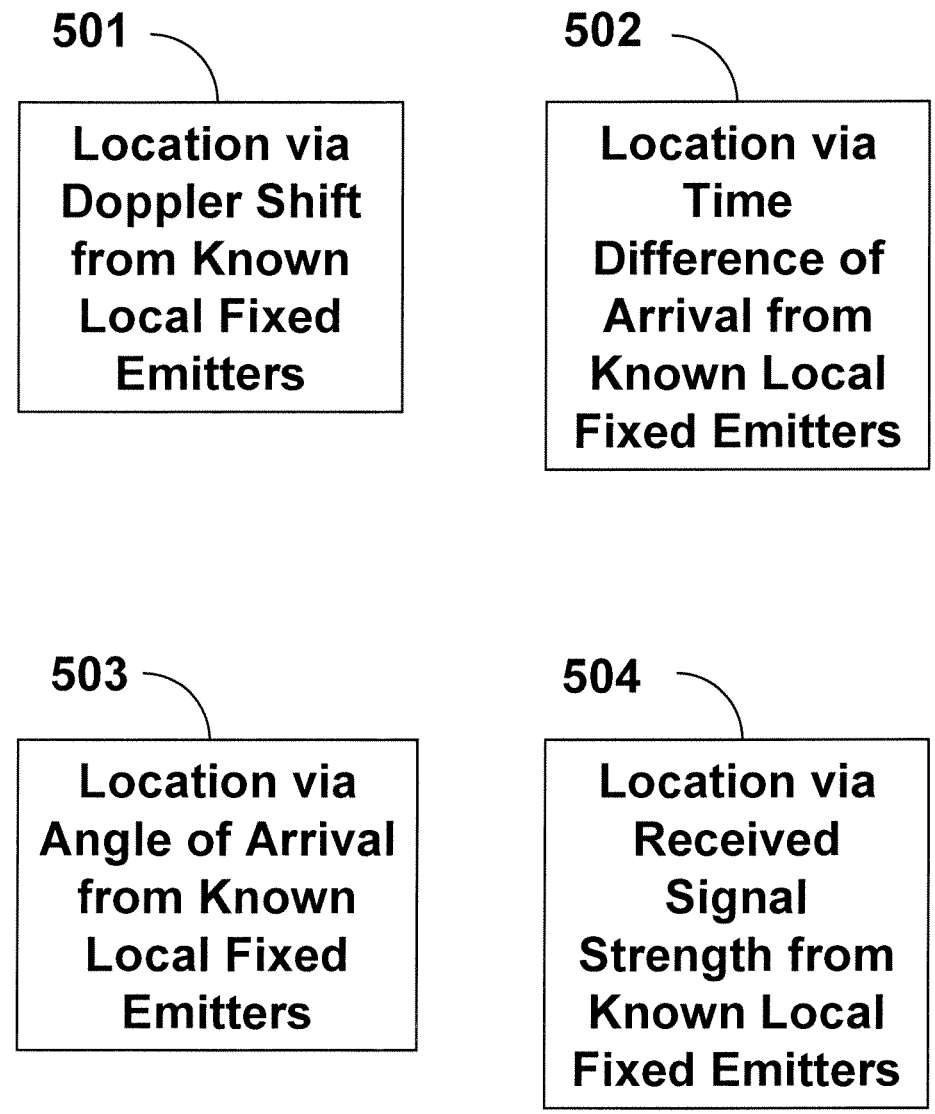
FIG. 5 illustrates example methods of navigation based upon known local fixed emitters.

FIG. 5 illustrates four example methods of navigating based upon signals from fixed emitters which may be known and found local to the area of a user navigation receiver. Measuring the Doppler shift of the frequency of the signals 501 provides a means of navigation based upon the known locations of the emitters, including the method disclosed in U.S. Pat. No. 8,040,275, "Method and Apparatus for Geographic Positioning," issued Oct. 18, 2011, and incorporated by reference herein in its entirety. Measuring the time difference of arrival of the signals 502 provides a means of navigation based upon the range from known locations of the emitters. Measuring the angle of arrival of the signals 503 provides a means of navigation based upon the known locations of the emitters. Measuring the received signal strength of the signals 504 provides a means of navigation based upon the range from known locations of the emitters.

Figure 6:
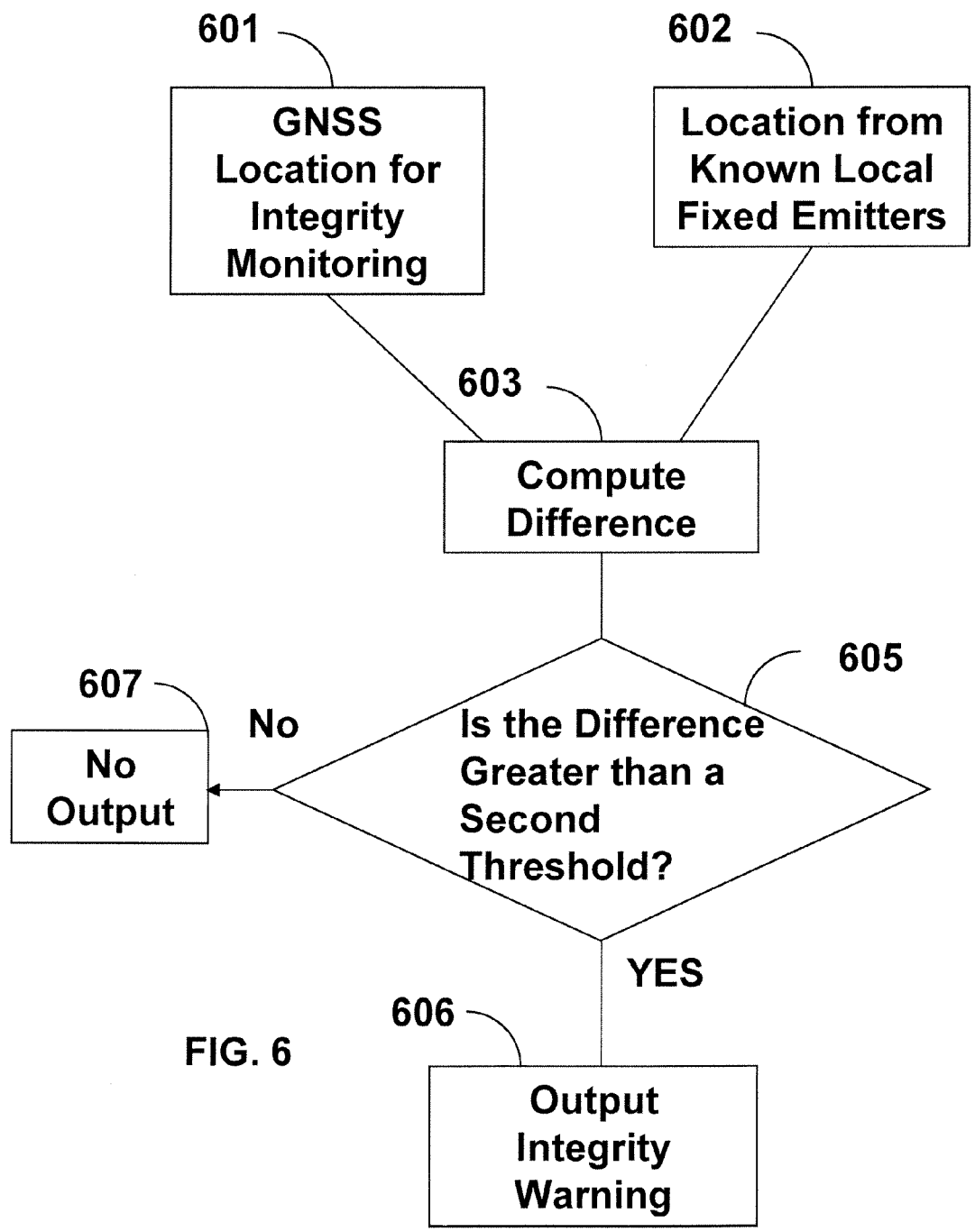
FIG. 6 illustrates a flow chart outlining an exemplary integrity monitoring process utilizing known local fixed emitters.

FIG. 6 illustrates a flow diagram of the top level logic for using known local fixed emitters as an input to integrity monitoring. In block 601, system receives location of aircraft 103 as determined from signals from GNSS 101. In block 602, system receives location as determined based on measurements of signals from known local fixed emitters 108. In block 603, a difference is computed between the location as determined from signals from GNSS 101 and the location as determined from the known local fixed emitter 108. In block 605, the difference is compared to a second threshold. If the difference is over the second threshold, then an integrity monitoring warning can be provided in block 606. Alternatively, if the difference between the two determined locations is not greater than the second threshold, the integrity warning is not outputted in block 607. This approach detects both the case of a fault in the GNSS control segment propagating to all the satellites in that system, as well as intentional spoofing of all the signals in that GNSS, through use of the independent information from the known local fixed emitters 602.

In one example, the second threshold has a value that is different than the value for first threshold. In one example, the values of the first threshold and the second threshold may be based on accuracy of determining the location of the aircraft based on signals from other GNSS 107 and from known local fixed emitters 108. In a case where the location of the aircraft can be more accurately determined from other GNSS 107, the first threshold value may be smaller than the second threshold value. Alternatively, if the location of the aircraft can be more accurately determined from signals from known local fixed emitters 108, the second threshold value may be smaller than the first threshold value.

Integrity Monitoring via Past Navigation History

Figure 7:
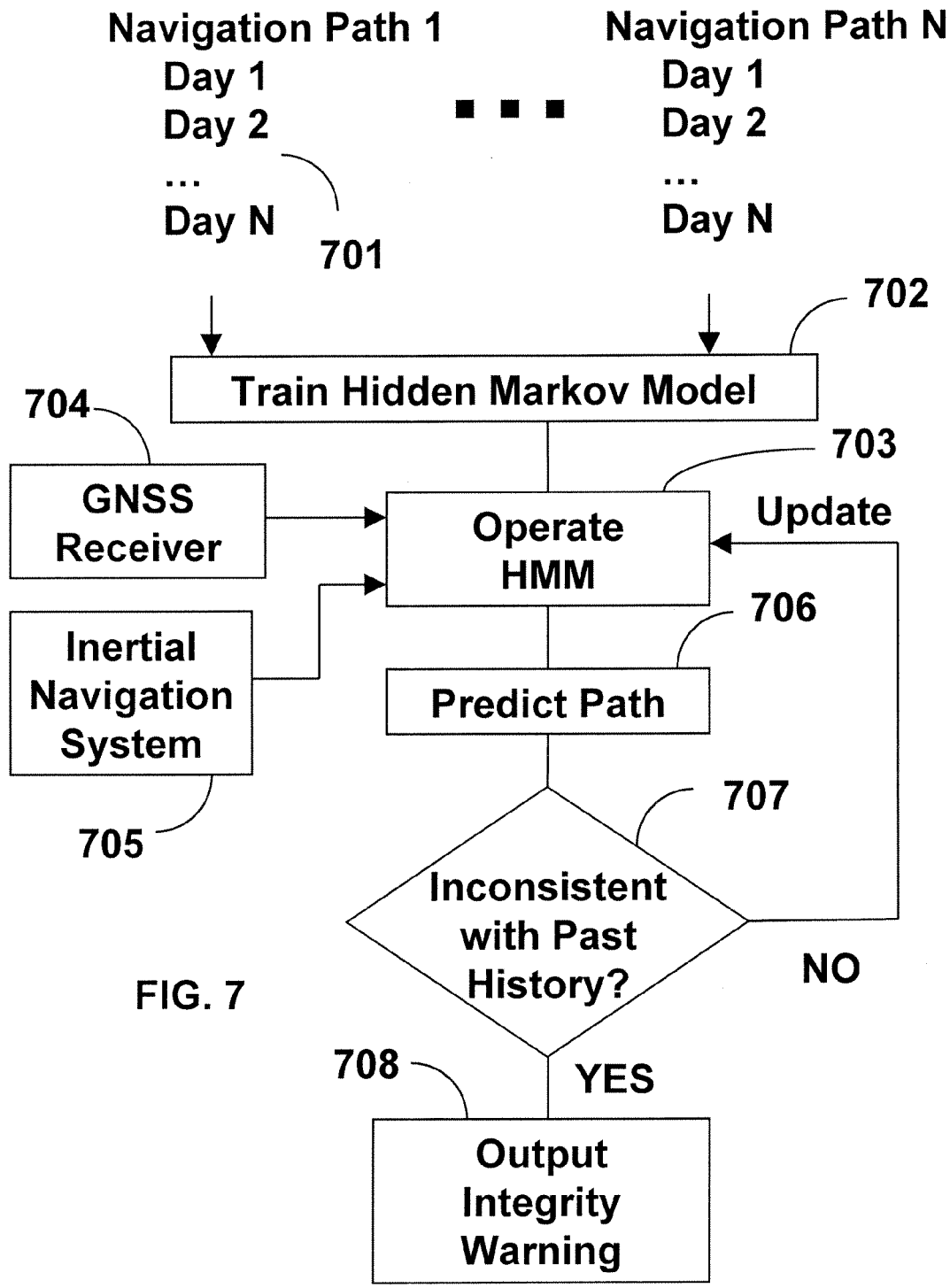
FIG. 7 illustrates a flow chart outlining an exemplary process utilizing past navigation history and a user inertial navigation system to assess consistency of locations from the GNSS navigation receiver which is being monitored for integrity.

FIG. 7 illustrates a flow diagram of the top level logic for using past navigation history to train and operate a Hidden Markov Model (HMM). The HMM method of utilizing contextual knowledge to enhance understanding of navigation sensor inputs, includes the method disclosed in U.S. application Ser. No. 12/858,034, "Contextually Aware Monitoring of Assets," filed Aug. 17, 2010, and incorporated by reference herein in its entirety. Past navigation history for a specific path 701 is accumulated over multiple days 1, 2, . . ., N. Past navigation history for additional N paths 701 is also accumulated over multiple days 1, 2, . . ., N. This navigation history data is used to train the HMM 702 for a user planning to transit a navigation path that has been transited many times before in the navigation history 701. The HMM is operated 703 in the user navigation receiver during transit of the navigation path. The HMM 703 takes as an input the GNSS locations 704 from the navigation receiver being monitored for integrity. The HMM 703 also takes in measurements from a user inertial navigation system 705. Based upon the training 702 and the external inputs 704 and 705, the HMM 703 predicts the navigation path 706. This predicted path 706 may be compared with past navigation history to determine whether it is inconsistent 707. Should the predictions be inconsistent with the past history then an integrity monitoring warning 708 can be provided. Should the predictions be consistent with the past history then the HMM 703 can be updated from the external inputs 704 and 705 to refine the accuracy of the HMM for making future path predictions 706.

Figure 8:
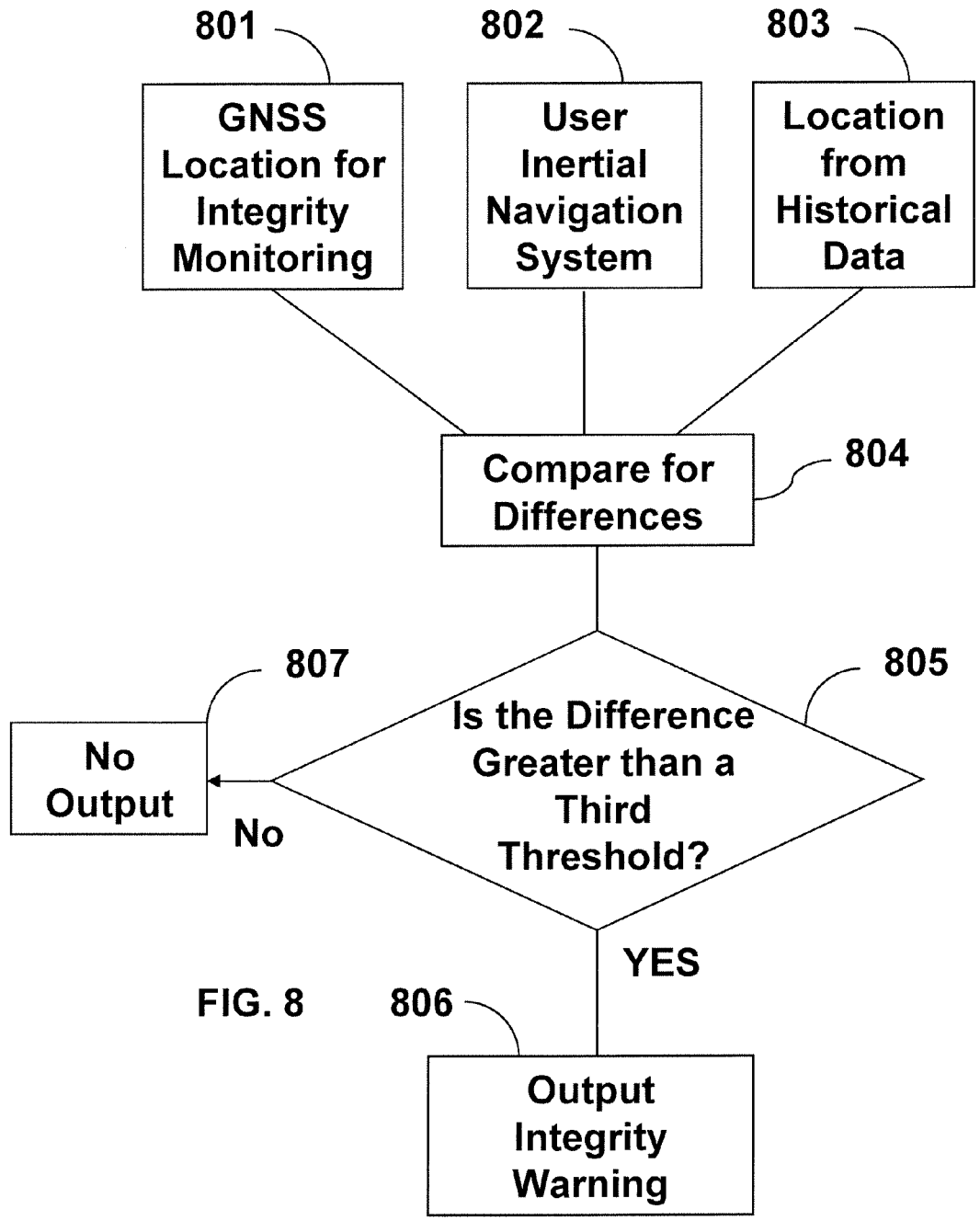
FIG. 8 illustrates a flow chart outlining an exemplary integrity monitoring process utilizing a user equipment inertial navigation system plus file of past navigation.

FIG. 8 illustrates a flow diagram of the top level logic for using past navigation history as an input to integrity monitoring. In block 801, system receives a location from the GNSS 101 being monitored for integrity. In block 802, the system receives measurements from a user inertial navigation system. In block 803, the system receives a location from previous navigation history. In block 804, the locations and measurements from blocks 801-803 are compared to determine one or more differences between the location from GNSS 101 and one or more of the locations from blocks 802 and 803. This comparison may be for example between a military supply aircraft that has been landing at an airbase daily for months with the same landing approach, to the navigation receiver location solution which is being monitored for integrity. Any variance in the GNSS locations as compared to the same landing paths previously taken could indicate an anomaly or integrity condition with that GNSS location.

In block 805, the difference is compared to a third threshold. If the difference is over the third threshold then an integrity monitoring warning can be provided in block 806. Alternatively, if the difference is not greater than the third threshold, then no integrity warning is outputted in block 807. Note that this approach detects both the case of a fault in the GNSS control segment propagating to all the satellites in that system, as well as intentional spoofing of all the signals in that GNSS, through use of the independent information from the inertial navigation system 802 and the past navigation history 803.

Fusion of Multiple Inputs for Integrity Monitoring

Figure 9:
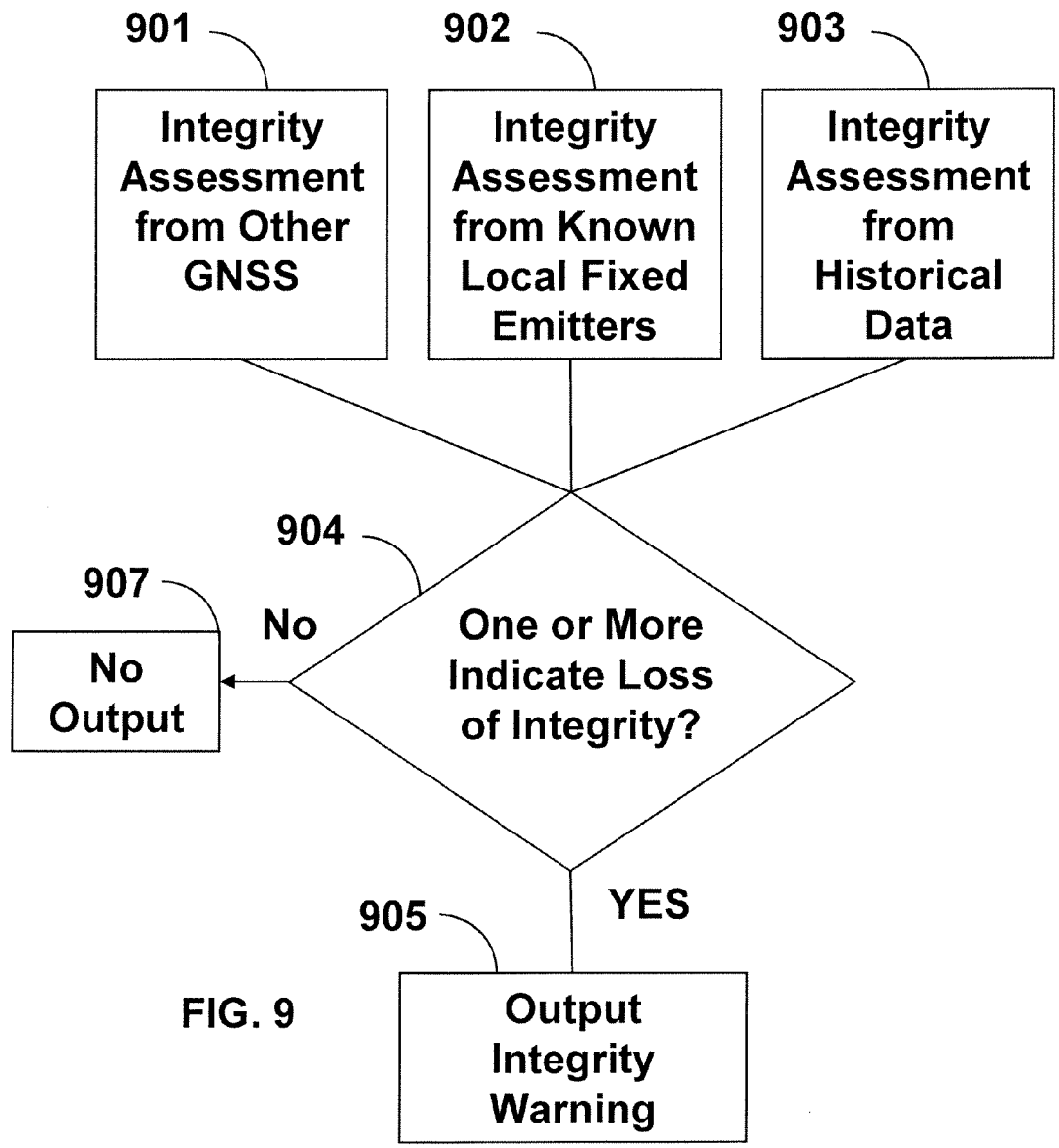
FIG. 9 illustrates a flow chart outlining an exemplary integrity monitoring process utilizing multiple fused inputs.

FIG. 9 illustrates a flow diagram of the top level logic for fusing multiple inputs for integrity monitoring. The multiple inputs shown include integrity assessment from other GNSS in block 901, integrity assessment from known local fixed emitters in block 902, and integrity assessment from historical navigation data in block 903. Each integrity assessment may indicate a loss of integrity, for example, when the respective difference exceeds the respective threshold. In one example, when one or more of these inputs indicate a loss of integrity in block 904, an integrity monitoring warning is provided in block 905. Alternatively, when none of these inputs indicate a loss of integrity in block 904, an integrity warning is not provided in block 907. In another example, when two or more of these inputs collectively indicate a loss of integrity, an integrity monitoring warning is provided in block 905. Alternatively, if two or more of these inputs do not collectively indicate a loss of integrity, an integrity warning is not provided in block 907.

Consider the example discussed for FIG. 8 in which a military supply aircraft has been landing at an airbase on a daily basis for months with the same landing approach. An adversary could arrange to spoof signals not only from one GNSS but from all GNSS, and/or could jam signals from local fixed emitters either as part of an attack upon the military aircraft landing or as another part of a military campaign. Fusion of the integrity monitoring check based upon previous navigation history could show that the spoofed GNSS signals are inducing false locations causing the aircraft to descend at much lower altitudes than previously recorded in past landings, so that the integrity warning provided could warn off a crash condition. It is through fusion of all of these methods of monitoring integrity that the error cases of multiple or all anomalous satellite signals in a GNSS constellation or constellations may be monitored and detected. Though this example was provided of a military scenario, this method for integrity monitoring also applies to other scenarios such as terrorism versus domestic airports.

System with Centralized Database to Provide Advanced Integrity Monitoring

Figure 10:
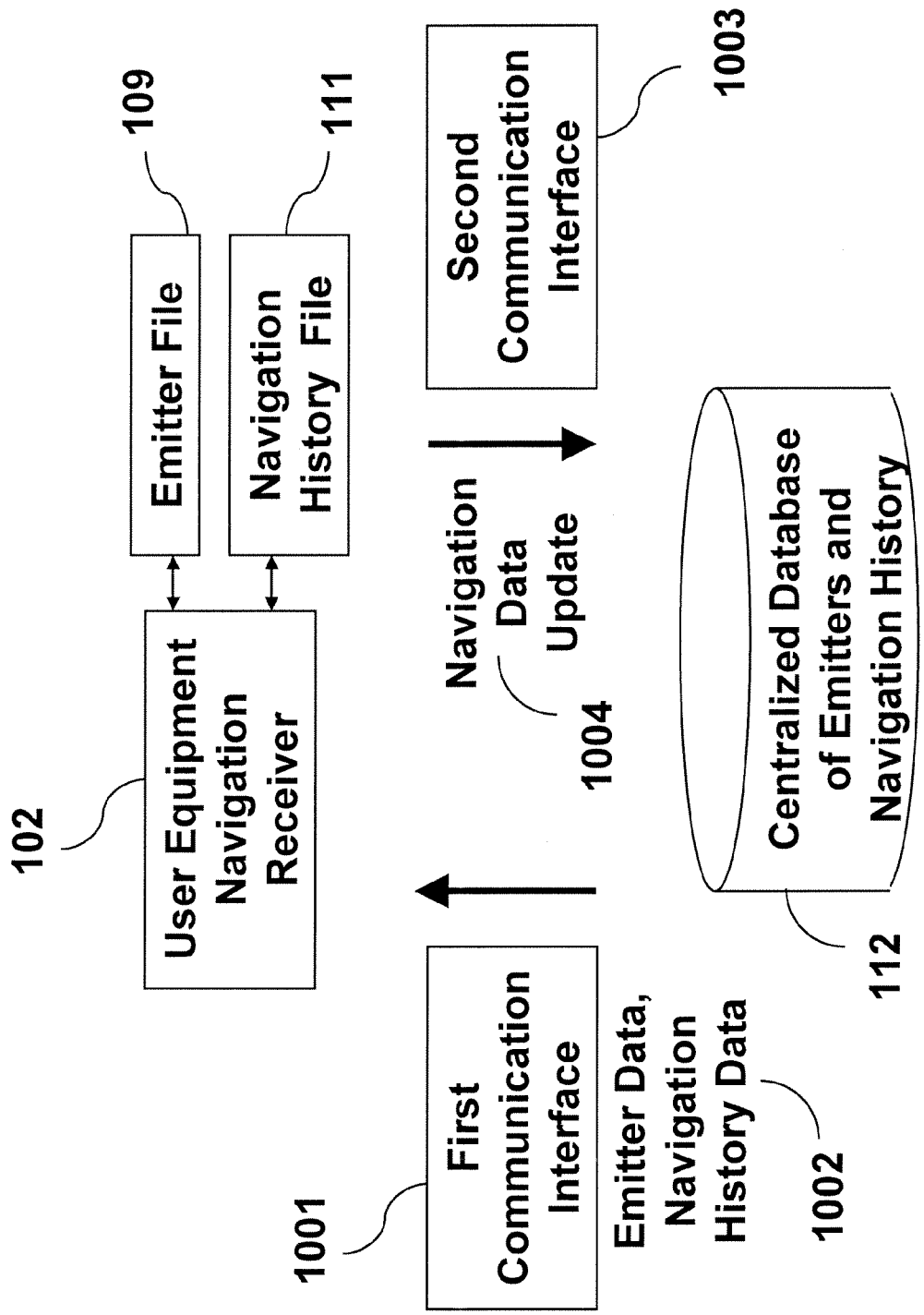
FIG. 10 illustrates a diagram of a system employing a centralized database to store, maintain and provide the data files to and from user navigation equipment.

FIG. 10 illustrates a system level view of the concept of the disclosure. One or many sets of user equipment navigation receivers 102 are supported by the system, to provide emitter file data 109 and navigation history file data 111 to the navigation receiver 102 prior to transiting a navigation path. The data to populate each of these files 109 and 111 is stored and maintained in a centralized system database 112. A first communications interface 1001 is used to load emitter data and navigation history data 1002 into the user navigation receiver 102 prior to transiting the navigation path. After the path has been transited, a second communications interface 1003 is used to return the recent navigation data 1004 for update to the centralized system database 112.

Figure 11:
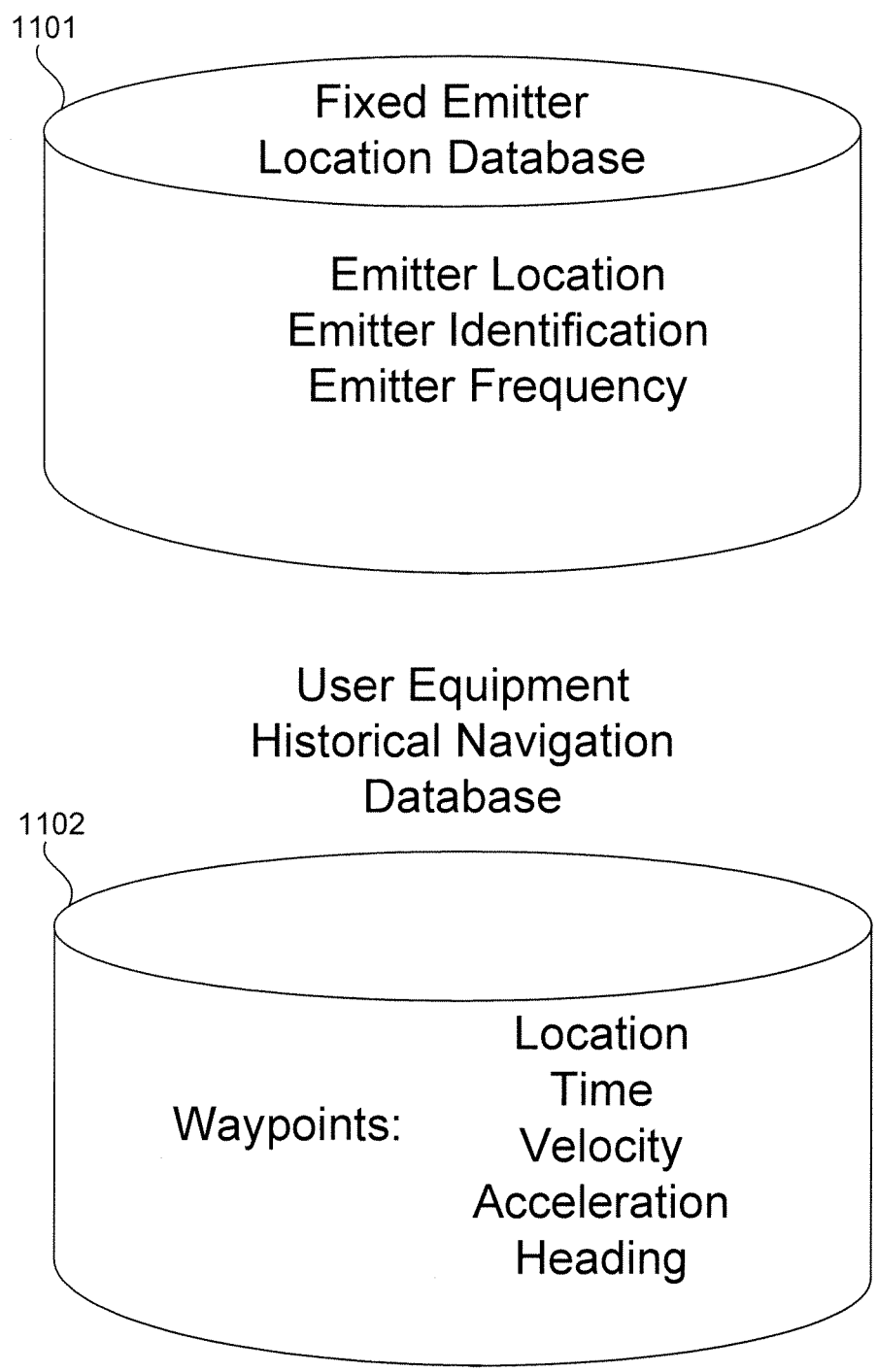
FIG. 11 illustrates a diagram of a centralized database that contains emitter and navigation history data.

FIG. 11 illustrates examples of the centralized system database. The database of fixed emitters 1101 may contain fields of emitter location, emitter identification and emitter frequency. The database of user navigation history 1102 may contain waypoints with fields of location, time, velocity, acceleration and heading.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A navigation user equipment system for providing highly available integrity monitoring of a GNSS, the system comprising:

a navigation user equipment, wherein the navigation user equipment is configured to assess integrity of a GNSS location obtained from the GNSS against one or more locations obtained from at least one other GNSS, and wherein the navigation user equipment is further configured to assess integrity of the GNSS location against locations obtained from signals generated by one or more known local fixed emitters, and wherein the navigation user equipment is further configured to assess integrity of the GNSS location based on historical data, wherein the historical data comprise at least one of measurements made by an inertial navigation system of a user equipment or prior measurements made by the user equipment during similar paths, and wherein the navigation user equipment is further configured to output an integrity warning when one or more of the integrity assessments indicate a loss of integrity of the GNSS;

a first communication interface configured to receive fixed emitter information and the historical data from a centralized database, wherein the first communication interface is further configured to load the received fixed emitter information and historical data into the user equipment prior to transiting a path; and a second communication interface configured to receive navigational data of the user equipment, wherein the second communication interface is further configured to load the navigational data of the user equipment after transiting a path into the centralized database to update the historical data.

2. The system of claim 1, further comprising:

providing, to the centralized database, an update to the historical based upon newly provided navigational data to extend the database to new navigational paths not previously recorded.

3. The system of claim 1, wherein the received fixed emitter location comprises emitter location, emitter identification and emitter frequency.

4. The system of claim 1, wherein the received user equipment navigational data comprises waypoints of location, time, velocity, acceleration and heading.

* * * * *